June 7, 1955 L. D. ROSS ET AL 2,710,208
UNIVERSAL JOINT
Filed Nov. 18, 1952 2 Sheets-Sheet 1
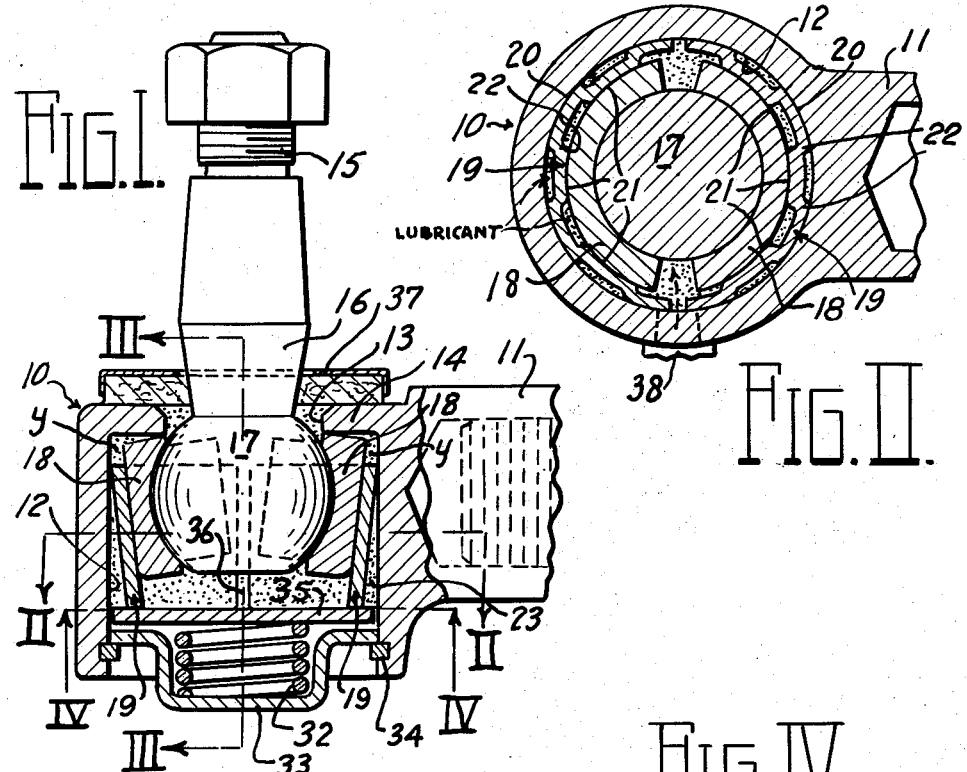
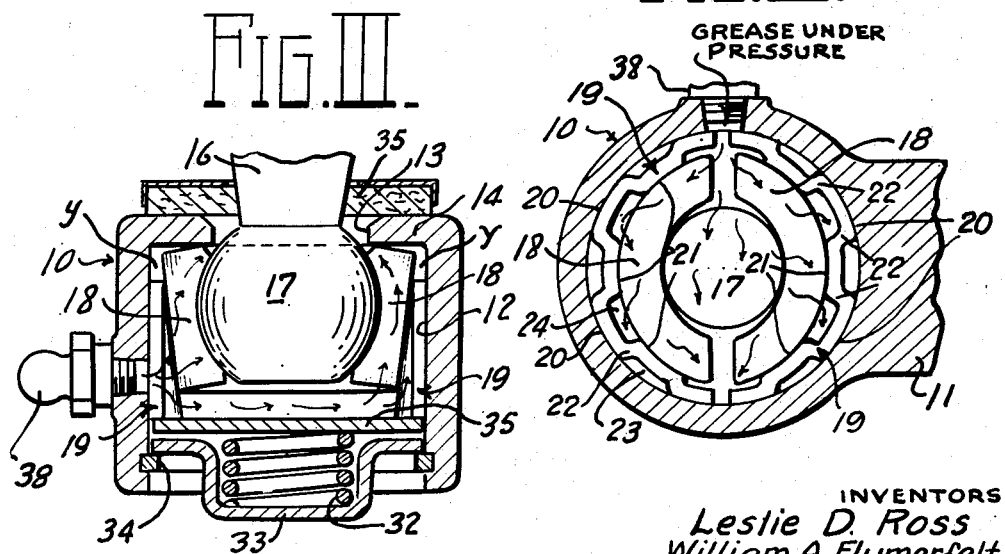
INVENTORS
Leslie D. Ross
William A. Flumerfelt
BY Edmund B Whitcomb
ATTORNEY

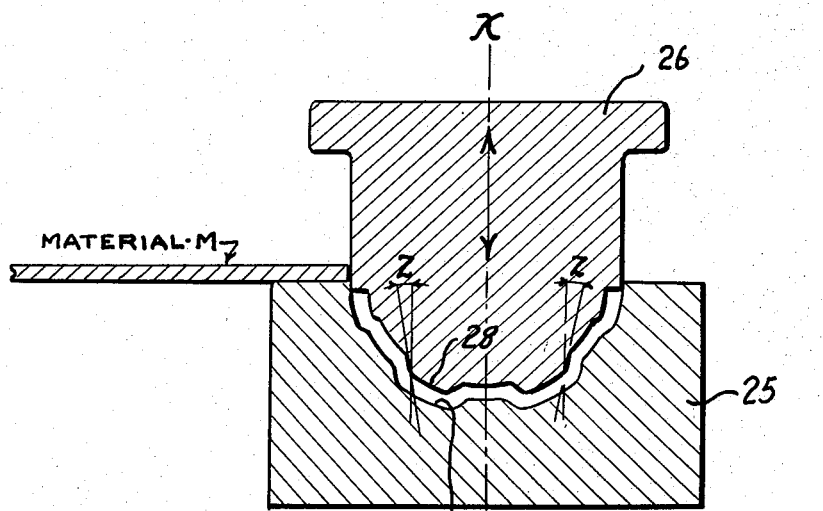
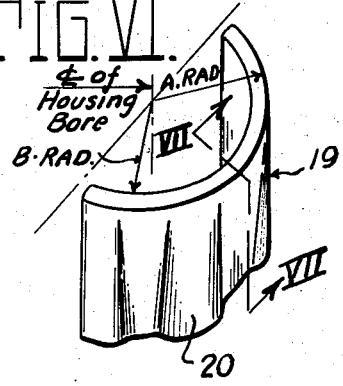
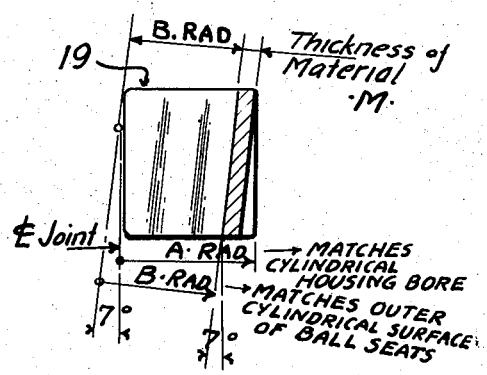
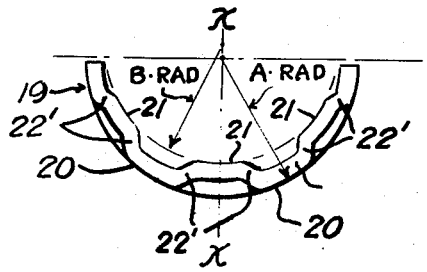

United States Patent Office 2,710,208
Patented June 7, 1955

2,710,208

UNIVERSAL JOINT

Leslie D. Ross and William A. Flumerfelt, Columbus, Ohio, assignors to The Columbus Auto Parts Company, Columbus, Ohio, a corporation of Ohio Application November 18, 1952, Serial No. 321,166

6 Claims. (Cl. 287—90)

The present invention relates to an improved universal joint with automatic take-up means to compensate for wear, said universal joint particularly adapted for automotive vehicle steering such as connections between tie rods, drag links and the control means therefor.

The present invention provides an improved, simplified construction giving long life, is also particularly economical in construction, and has for an object the incorporation in a universal joint of a resilient means inherent in certain elements of the joint. It has also long been a problem in universal joints with take-up means therein to obtain satisfactory lubrication and the present invention particularly solves this difficulty, since certain elements of the joint are inherently arranged to provide pockets for receiving a lubricant so that the construction with the take-up means and assembly of the various parts of the joint particularly facilitates storage and distribution of the lubricant.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a section through a joint embodying the present invention;

Figure II is a section on the line II—II of Figure I;

Figure III is a section on the line III—III of Figure I;

Figure IV is a section on the line IV—IV of Figure I, looking in the direction of the arrows;

Figure V is a diagrammatic illustration of one method of making the combined resilient and take-up means;

Figure VI is a perspective view of one of the elements produced by the illustration in Figure V;

Figure VII is a section on the line VII—VII of Figure VI, illustrating the particular configuration of the wedge element; and Figure VIII is a bottom view of the member shown in Figure VI.

Referring to Figure I, the housing 10 is shown as connected with a tenon 11 for assembly with the tie rod in an automobile steering mechanism. The housing 10 has a cylindrical bore 12 extending from the lower end therethrough adjacent the top side of the housing where a smaller opening 13 is provided at that end of the housing, the result being the formation of an inwardly extending flange 14.

The integral ball and ball stud is illustrated as having the stud 15 and neck portion 16 and full ball 17, which unit, in practice, is hardened and has a provision illustrated in the threads and nut for connection with the steering knuckle, for example.

Between the ball 17 and the cylindrical inner wall 12 of the housing 10 is interposed a pair of similar oppositely arranged ball seats 18 and a special construction of a pair of cooperating resilient and lubricant retaining wedge members 19.

It is understood that the ball seats 18 are of hardened material and each has an inner spherically-shaped surface to fit around the ball 17 and an outer cylindrical-shaped surface.

Each separate wedge member 19 may be formed, for example, from a strip of transversely corrugated metal, the corrugations being tapered from one edge to the other as shown. These strips are curved to fit on one side against the ball seats 18, and at the other side against the housing wall 12. We have designated the outer flattened and curved ridge portions of the wedges as 20, the inner curved ridge portions as 21 and the connecting webs as 22. At the top in the assembled joint these wedge members 19 have no corrugations at all, while at the bottom, the corrugations are a maximum in depth at the central portion as shown. In the figures illustrating a slightly modified embodiment of our invention (Figures V to VIII) we show more fully how these outer and inner ridge portions form or present in effect an outside cylindrical "wall" to fit against the cylindrical housing bore 12, while the inner ridge portions 21 form in effect an inner "wall" to fit around the outside of the ball seats 18. Since the axes of said cylindrical "walls" are located at an angle of about seven degrees, these inner and outer "walls" are also positioned at an angle one with respect to the other. Vertically of the joint these corrugations or outer and inner ridges 20 and 21 are here shown of substantially uniform width, the "wedge" effect being produced by the variation in the depth of the web portions 22 of the wedge members 19. Thus, when assembled in the joint, these inner ridges 21 form with the cylindrical housing wall 12, lubricate receiving pockets 23. Similarly, on the opposite side of the wedge member 19 are formed lubricant pockets 24 between the wedge member and the outer cylindrical surfaces of the ball seats 18. The corrugated wedge-shaped take-up members 19 of the embodiment of Figures I to IV are slightly different from the take-up members 19 dislosed in the embodiment illustrated in Figures V to VIII, since in the embodiment of Figures I to IV, the side walls or webs 22 are radially arranged with respect to the axis of the ball 17, whereas, these side walls or webs 22' of the wedge take-up members 19 of Figures V to VIII are divergently arranged instead of converging toward the axis of the stud.

In Figures V to VIII, we have diagramatically illustrated one method of producing a satisfactory wedge element 19, where it will be seen that we have indicated the use of a punch press with the stationary die 25 and the movable die punch 26. The stationary die 25 has the configurations 27 therein for giving the tapered, corrugated configuration to the wedge 19 on one side thereof, while the die punch 26 has the configuration 28 to give the formation to the other side required to complete the proper shape for the wedge members.

It will be understood that in this embodiment of the invention the wedge members 19 have the transverse corrugations formed in such a way that the punch 26 may move vertically in and out of the stationary die member 25 during stamping operation. Hence, no one of the corrugations can have an "undercut" to prevent this action. The sloping lines Z on Figure V indicates this feature. It will be noted that in Figure V, the material is indicated at M and this material may be made of varying degrees of thickness dependent upon the resiliency in the final wedge member desired. The material M is fed to the punch press as a strip and cut off to length by suitable means for each wedge member 19 during the punch press operation itself. The strip may be separately cut to proper length and each short piece separately inserted into the punch press.

The modified wedge member 19 is illustrated in Figures VI to VIII, laid out geometrically to give the required configuration to the transverse tapered corrugations and the cylindrical overall shape of the modified half wedge member 19. Referring more in detail to these geometric figures, we have illustrated one practical embodiment of a member 19 in which the wedge member 19 has a taper of seven degrees transversely of the wedge. Here, the outside cylindrical surface or "wall" of the wedge member determined by the flattened and curved ridge portions 20 of the corrugations conforms to the inner cylindrical bore 12 of the housing and is parallel to the axis of the stud 15 in normal position. In Figures VI, VII and VIII, this radius of this outer cylindrical "wall" is marked radius A. The inner configuration of the corrugations determined by the inner flattened ridge portions 21 thereof describes a cylinder on the radius B, the cylinder being inclined to fit the outer surfaces of the ball seats 18. As shown in Figure VIII, the centers of these radii A and B are in different positions so that the general configuration of the outline of the base of the wedge member is crescent-shaped. The connecting sections or web portions 22' of the embodiment of Figures V to VIII between the portions 20 and 21 being arranged at varying angles relative to the outer and inner ridge portions, as shown, render the wedge members 19 more readily removable from die 25. Specifically, these sections 22' are located at divergent angles with respect to planes passing through said sections and parallel to the axis of the die punch 26 as indicated by the line X—X in both Figures V and VIII.

A spring 32 is retained in the housing by a cup-shaped retaining plate 33 which may be suitably attached to the housing 10 by a spring ring 34 sprung into a retaining groove on the lower edge of the housing 10 as shown. Interposed between the upper edge of the spring 32 and the lower edge of the members 19 is a disc 35. The upper surface of the disc 35 contacts the lower rim of the wedge members 19 as shown. In this manner the spring 32 is continually urging the wedge members in a direction longitudinally of the axis of the ball stud 15 and automatically adjusts the various parts of the joint to take up for wear.

It will be noted that the ball seats 18 are separated on a large V as shown in Figures I and IV so that lubricant may pass therebetween and that the resilient wedge members 19 are spaced vertically from the flange 14 to provide space Y whereby the same may receive the upper edges of wedges when moved to compensate for wear. This space Y also forms a passage through which the lubricant may work up through the upper portion of the joint. It is also noted that the wedge members 19 are spaced apart vertically along the line 36 to further facilitate operation of the joint and distribution of the lubricant.

It is to be understood that a slideable cover 37 surrounds the neck 16 of the ball stud and rests upon the upper surface of the flange 14 of the housing 10.

A suitable lubricant coupling 38 is shown whereby lubricant may be supplied to the joint and is illustrated in Figure IV. The lubricant nipple 38 is directly opposite the passages between the opposed ball seats 18 and the cooperating wedge members 19. We have indicated in Figures III and IV, by the various arrows, the movement of the lubricant when used in the present invention with the lubricant receiving pockets as described above. The present invention provides a joint capable of receiving an increased amount of lubricant and also facilitating, when subject to use due to extensive vibration and universal movement of the parts, an increased distribution or circulation of the lubricant to every part of the joint, particularly efficiently lubricating the surfaces of the wedge members in contact on one side with the external surfaces of the ball seats and on the other side with the inner wall of the housing.

It is apparent that, within the scope of the invention, modifications and different arrangements may be made other than is herein disclosed, and the present disclosure is illustrative merely, the invention comprehending all variations thereof.

What we claim is:

1. In a universal joint, a housing having a cylindrical bore therein with an inturned flange at one end with a central opening therethrough; a stud and ball part located within said housing with said stud extending through said opening; a pair of opposed separated ball seats, each having an inner surface conforming to and surrounding said ball part, said seats having cylindrical outer surfaces, the ends of said seats adapted to contact said flange on said housing; a pair of separate resilient corrugated members formed of material of substantially uniform thickness interposed between said seats and said cylindrical wall of said housing, the corrugations of said members being tapered in the direction of the axis of said ball stud to form a base wider than the other end of said corrugations and provide lubricant receiving spaces, the thinner end of said members being spaced from said housing flange; means to close the other end of said housing; and spring means interposed between the widened base of said corrugated members and said closed end of said housing to urge said members toward the other end of said housing to maintain said seats in operative contact with said ball part and compensate for wear.

2. In a universal joint, a housing having a cylindrical bore therein with an inturned flange at one end with a central opening therethrough; a stud and ball part located within said housing with said stud extending through said opening, the axis of the bore in said housing being in alignment with the normal axis of the ball part and stud; a pair of opposed separated ball seats, each having an inner spherically-shaped surface conforming to and surrounding said ball part, said seats having cylindrical outer surfaces normally inclined to said axis of said stud, the ends of said seats adapted to contact said flange on said housing; a pair of separate resilient transversely corrugated members formed of material of substantially uniform thickness interposed between said seats and said cylindrical wall of said housing, the corrugations of said members being of varying depths and tapered in the direction of the axis of said ball stud; the external ridge portion of said corrugations forming an interrupted cylindrical configuration confronting to and fitting within said cylindrical bore in said housing and the internal ridge portion of said tapered corrugations forming an interrupted inclined cylindrical configuration conforming to and fitting against the cylindrical surfaces of said ball seats, the opposite connecting sections for each external ridge portion being arranged at divergent angles; means to close the other end of said housing; and spring means acting longitudinally of said axis of the stud and interposed between the widened base of said corrugated members and said closed end of said housing to wedge said members between said housing and said seats to maintain the parts of said joint in operative contact with each other and take up for wear.

3. In a universal joint, a housing having a cylindrical recess therein, one end of said housing being closed; a stud and ball part; a pair of opposed ball seats having an inner surface conforming to and surrounding said ball part, said seats having cylindrical outer surfaces; a pair of wedge-shaped corrugated curved members surrounding said seats and interposed between said seats and said cylindrical recess in said housing, the corrugations of said members decreasing in depth from the edge of said members adjacent the closed end of said housing to the other end thereby forming a base wider than the other end of said wedge-shaped members, the outer ridge portions of said corrugations conforming to and contacting the cylindrical recess in said housing and the inner ridge portions conforming to and contacting the outer cylindrical surface of said ball seats; and spring means positioned in said joint adjacent the closed end of said housing arranged to urge the wide edge of said wedge-shaped members toward the other end of said housing to maintain said seats in operative contact with said ball part and compensate for wear.

4. In a universal joint, an open ended housing having a cylindrical recess therein, the open end of said housing having an internal flange and the other end of said housing being closed; a stud and ball part, said stud extending through said housing opening; a pair of opposed ball seats having an inner surface conforming to and surrounding said ball part, said seats having cylindrical outer surfaces; a pair of wedge-shaped corrugated curved take-up members surrounding said seats and interposed between said seats and said cylindrical recess in said housing, the inner and outer ridges of the corrugations of said members extending longitudinally of said joint and decreasing in depth from the edge of said members adjacent the closed end of said housing toward the other end, thereby forming a base wider than the other end, the outer surfaces of the outer ridge portions of said corrugations being circumferentially curved to conform to and contact the cylindrical recess in said housing and the outer surfaces of the inner ridge portions of said members circumferentially curved to conform to and contact the outer surface of said ball seats; and spring means positioned in said joint adjacent the closed end of said housing arranged to urge the wide edge of said wedge-shaped members toward the other end of said housing to maintain said seats in operative contact with said ball part and compensate for wear.

5. In a universal joint, a housing having a cylindrical recess therein, one end of said housing being closed; a stud and ball part; the axis of said cylindrical recess being substantially in alignment with the normal longitudinal axis of said stud; a pair of opposed ball seats each having an inner spherical surface conforming to and surrounding said ball part and an outer cylindrical surface each normally located at an angle to said normal longitudinal axis of said stud; a pair of wedge-shaped corrugated curved members surrounding said seats and interposed between said seats and said cylindrical recess in said housing, the depth of the corrugations of said members decreasing from that edge of said members adjacent the closed end of said housing to the other end thereof, the outer surfaces of adjacent outer ridge portions of said corrugations forming an interrupted cylindrical wall adapted to conform to and contact the cylindrical recess in said housing and the ball seat contacting surfaces of the inner ridge portions forming an interrupted cylindrical wall normally positioned at an angle to said first-mentioned interrupted wall, said angle corresponding to the first-mentioned angle of the outer surface of said ball seats to said stud axis; and spring means positioned in said joint adjacent the closed end of said housing arranged to urge the wide edge of said wedge-shaped members toward the other end of said housing to maintain said seats in operative contact with said ball part and compensate for wear.

6. In a universal joint, a housing having a cylindrical recess therein, one end of said housing being closed; a stud and ball part; the axis of said cylindrical recess being substantially in alignment with the normal longitudinal axis of said stud; a pair of opposed ball seats each having an inner spherical surface conforming to and surrounding said ball part and an outer cylindrical surface each normally located at an angle to said normal longitudinal axis of said stud; a pair of wedge-shaped corrugated curved members surrounding said seats and interposed between said seats and said cylindrical recess in said housing, the corrugations of said members comprising outer ridge portions, inner ridge portions and triangular-shaped connecting web portions, the deepest edge of said web portions being adjacent the closed end of said housing, the outer surfaces of adjacent outer ridge portions of said corrugations forming an interrupted cylindrical wall adapted to conform to and contact the cylindrical recess in said housing, the triangular-shaped web portions positioning the interrupted wall formed by the ball seat contacting surfaces of the inner ridge portions at an angle to said first-mentioned interrupted wall, said angle corresponding to the first-mentioned angle of said ball seats; and spring means positioned in said joint adjacent the closed end of said housing arranged to urge the wide edge of said wedge-shaped members toward the other end of said housing to maintain said seats in operative contact with said ball part and compensate for wear.

References Cited in the file of this patent

UNITED STATES PATENTS

| 1,891,804 | Flumerfelt | Dec. 20, 1932 |
| 2,106,860 | Tibbetts | Feb. 1, 1938 |
| 2,527,787 | Berger | Oct. 31, 1950 |

FOREIGN PATENTS

| 362,271 | Great Britain | Dec. 3, 1931 |